United States Patent [19]

Harig

[11] Patent Number: 4,504,118
[45] Date of Patent: Mar. 12, 1985

[54] INDEPENDENTLY MOVEABLE EXTERNAL REAR VIEW MIRRORS WITH CONNECTED FRAME MOUNTS

[76] Inventor: Fred L. Harig, 1050 Hwy. 67, Florissant, Mo. 63031

[21] Appl. No.: 450,635

[22] Filed: Dec. 17, 1982

[51] Int. Cl.³ .............................................. G02B 7/18
[52] U.S. Cl. ..................................... 350/626; 248/479
[58] Field of Search ............... 350/303, 304, 288, 299, 350/307, 590; 248/475 R, 479, 480, 486, 466

[56] References Cited

U.S. PATENT DOCUMENTS

| | | | |
|---|---|---|---|
| 2,582,651 | 1/1952 | Peterson | 350/304 |
| 2,663,225 | 12/1953 | Blan | 350/304 |
| 3,048,084 | 8/1962 | Iannuzzi | 350/304 |
| 3,545,290 | 5/1968 | McCord et al. | 248/486 |
| 3,977,774 | 8/1976 | O'Sullivan | 350/304 |
| 4,111,532 | 9/1978 | Budish | 350/307 |
| 4,253,738 | 3/1981 | Linkous | 350/304 |

FOREIGN PATENT DOCUMENTS

| | | | |
|---|---|---|---|
| 7401349 | 8/1975 | France | 350/304 |
| 145039 | 11/1980 | Japan | 350/304 |

*Primary Examiner*—Jon W. Henry
*Attorney, Agent, or Firm*—Paul M. Denk

[57] ABSTRACT

A vehicle mirror for providing enhanced vision for the driver, and for use in conjunction with the existing external rearview mirror and frame associated with the vehicle, upper and lower brackets secure with the existing frame and mirror, said brackets supporting a frame member that secures around a gasket and additional mirror, a back plate for the additional mirror to guard it against breakage, the frame member being fabricated of a pair of frame parts, held together at their upper and lower end turned ends by means of a connector, with each of the connectors securing with one of the upper and lower brackets for securement of the additional mirror to the existing rearview mirror of the vehicle.

1 Claim, 4 Drawing Figures

INDEPENDENTLY MOVEABLE EXTERNAL REAR VIEW MIRRORS WITH CONNECTED FRAME MOUNTS

CROSS REFERENCE TO RELATED APPLICATION

This application is related to and comprises a continuation-in-part of my earlier application filed on Feb. 3, 1982, under Ser. No. 345,486 now abandoned.

BACKGROUND OF THE INVENTION

This invention relates generally to a vehicle rearview mirror, but more particularly pertains to supplementing the view of the driver by adding an additional pivotally mounted mirror either in conjunction with the existing mirror, or another mirror, as operatively mounted laterally of the driver or passenger side of the vehicle.

Various rearview mirrors of a variety of designs have been adapted for use in the prior art. For example, every vehicle now, by law, requires the use of rearview mirrors, usually externally of the vehicle, in order to augment the view of the driver to the back of his vehicle and particularly for safety purposes. But, the prior art has given consideration to the fact that particularly in larger vehicles, sometimes it is difficult to obtain an all encompassing rear viewing of the vehicle structure, and for example, as can be seen in the U.S. Pat. No. 2,279,751, to E. E. Hensley, and entitled Rearview Mirror, a mirror having particularly integral structured reflecting parts that provide rear viewing, at least at two or more angles, is shown. While the structure of this Hensley mirror touches upon the concept of the current invention, and that is to provide multiple angles for rear viewing to the back of the vehicle, one of the problems associated with this prior art mirror is that its reflecting angles are fixed, thereby preventing an adjustment as desired and required by the driver in order to achieve a complete viewing regardless of what angle of turn may be made, or just how sharp of a reverse turn may be undertakened by the driver of his vehicle. This is particularly a problem where large vehicles are involved such as a bus, a tractor-trailer, and related type of means of transportation.

The patent to Kounch, U.S. Pat. No. 2,605,676, discloses the use of laterally clamped convex mirrors for affording more widespread viewing by the driver from his interiorly arranged rearview mirror assembly. While the concept of this Kounch assembly may be desirable and enhance the rear viewing by the driver particularly when operating a motor vehicle, such as a passenger car, the concept of providing laterally arranged clamped on mirror parts, as shown in this prior art patent, does not solve the problem that is encountered by the driver of a large vehicle, such as the tractor-trailer disclosed in this invention, since supplemental rear viewing is required at the externally arranged mirrors, as shown, whereas, having extra viewing at the internal rearview mirror does not provide the driver with means for viewing the back edge of his large trailer, or further viewing laterally thereof, particularly when the driver is backing the vehicle up, as on a curved path, or making a sharp turn around a corner during forward transit.

In view of the foregoing, it is the principal object of this invention to enhance the rear viewing by a driver of a tractor-trailer or a bus, or other large vehicle, by adding an additional adjustable mirror in conjunction with the existing externally arranged rearview mirror for such an operating vehicle.

A further object of this invention is to provide an additional rearview mirror for mounting in association with an existing mirror, and which is pivotally connected therewith so as to allow for ease of its adjustment for obtaining more complete and full viewing rearwardly of the vehicle during its operation.

Another object of this invention is to supplement and enhance the rear viewing by the driver of a large vehicle so as to add to his safety, and that of any pedestrian nearby, particularly when the large vehicle is being backed up, turned, or being maneuvered during parking.

Still another object of this invention is to provide a structured additional mirror, that is connected together by means of a series of frames and brackets, and which provides for its ease of connection with the existing rearview mirror or its frame structure operatively associated with a large motor vehicle.

Still a further object of this invention is to provide an additional rearview mirror for a motor vehicle and which is conveniently mounted within gaskets, and supported and protected by means of a back plate, so as to assure the longevity of its usage in association with a motor vehicle.

These and other objects will become more apparent to those skilled in the art upon reviewing the summary of this invention, and upon undertaking a study of the description of its preferred embodiment, in view of the drawing.

SUMMARY OF THE INVENTION

This invention, as previously alluded to, particularly is useful in conjunction with the larger vehicles in the nature of the tractor-trailer, and in referring to FIG. 2, it can be seen that such a trailer A, is driven by its tractor or cab B, and provided upon the cab, is the usual rearview mirror C that is useful for providing limited rear viewing particularly during transit or maneuvering of the trailer. But, when the trailer must be manipulated into tight locations, such as when backing up upon a turn, making a turn during forward motion, or while being parked, it can be seen that the sight of viewing from the standard mirror C, as along the sight line D, is rather limited, particularly when the path of travel is along a curve, such that the driver is only given a view of the side of the trailer, cannot see its back end thereof, nor have any indication as to what may be behind the trailer, or what the trailer may be backing into, or hitting, particularly when manipulating the same into a tight and confined location. Thus, the current invention supplements the viewing by the driver through his rearview mirror by adding a supplemental or additional mirror E, and which is adjustable along a pivot line into a variety of directional angles, so that the driver can preset the additional mirror, of this invention, and provide an additional line of sight, upon viewing through it, such as along the sight line F, as shown. Thus, as can be seen, the additional mirror of this invention E is adjusted into that proper arrangement that allows also for a viewing directly to the rear of the trailer, as it is normally being backed along its curved path of travel such as when it is backing into a parking space, backed through a turn, or simply moving through a turn in the forward direction, and the driver may want to know if the side of his trailer may brush against or about to hit a light standard, sign, or any other obstacle that may be at the proper location, but yet inconveniently in the way of the path of travel of the vehicle.

The invention more specifically includes a pair of upper and lower brackets, that may be fixed directly with the existing rearview mirror, or what may be standardly known as the west coast mirror, and secured in place, with said brackets extending outwardly for receiving in a pivotal connection, but yet in a tight embrace, an additional rearview mirror that provides that extra viewing along another path of sight as previously explained. To hold the mirror in place, a back panel is desired to provide it with stable support, and in addition, to furnish protection for the mirror for the backside so that no rock or other debris may hit it, and break it, as during transit. Furthermore, a frame means, including a pair frame parts, embrace the side peripheries of the disposed mirror, incorporate a gasket between its slotted interior and the sharp edges of the reflecting mirror, and with the upper and lower ends of the frame parts being inturned, directed towards the centerline of the mirror, where they are secured with upper and lower connectors, to firmly fix the frame parts about the periphery of the mirror, and with the connectors providing fastening means for securement with the identified upper and lower brackets, as affixed to the standard rearview mirror frame.

Thus, while this additional mirror is snugly secured by means of brackets to the existing rearview mirror and its frame, said additional mirror will also conveniently undertake some pivoting under force so that its direction of sight can be properly arranged in order to furnish the driver with the particular line of vision that he feels is most necessary and required under the circumstances in order to add to the safety of his driving and manipulation of the tractor-trailer.

BRIEF DESCRIPTION OF THE DRAWING

In the drawing, FIG. 1 provides a perspective view of a tractor-trailer embodying the current invention.

DESCRIPTION OF THE PREFERRED EMBODIMENT

Figure 1:
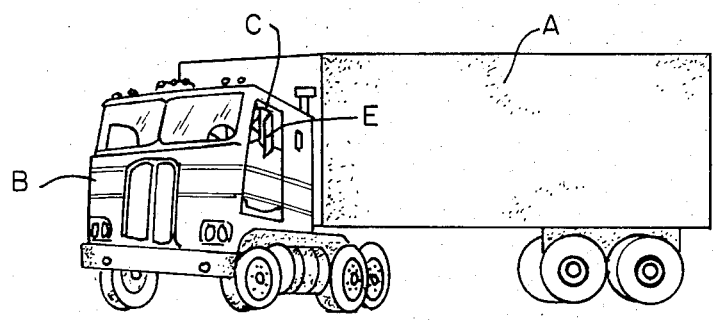
Figure 3:
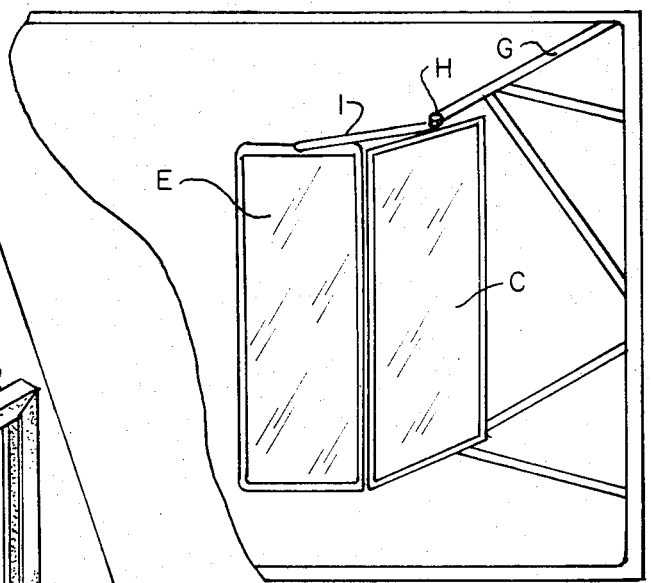
FIG. 3 furnishes a perspective view of the additional mirror of this invention as mounted to the standard rearview mirror of a vehicle; and, FIG. 4 provides an exploded view of the various components that make up the maxi-vision mirror of this invention.
Figure 4:
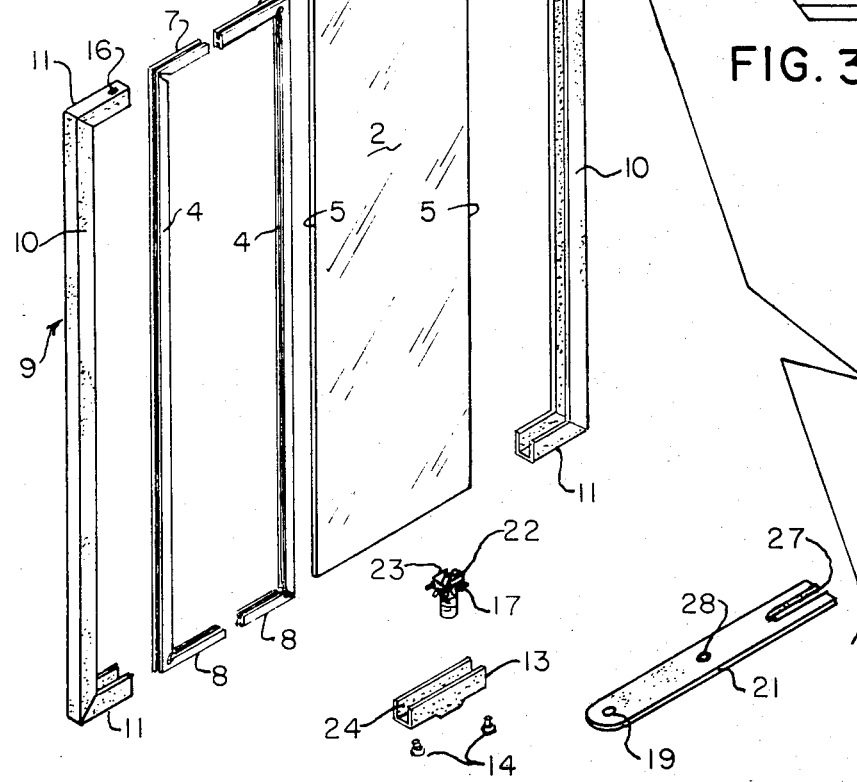

In referring to the drawings, and in particular FIG. 1, the type of vehicle upon which the maxi-vision mirror of this invention is mounted is disclosed, usually will be the large size vehicle, as previously explained, comprising the trailer part A driven by its tractor or cab B, and incorporating the rearview mirror C and the additional or maxi-vision mirror E of this invention. The various lines of vision or sight, have been previously explained, but as shown in FIG. 3, the additional or maxi-vision mirror E of this invention will be connected by means of its upper and lower brackets, such as the upper bracket as shown in 1, to the existing frame work G that is originally connected with the cab of the vehicle. As is further seen, the standard rearview mirror C has been previously connected with the frame work G by means of a series of fastening means, such as the bolt H, as shown, at both its upper and lower edges, and this particular mirror certainly is useful for providing the type of rear viewing that the driver normally needs while the vehicle is traveling in a linear path down a highway, but such a mirror does not accommodate and provide the wide breadth viewing that may be required particularly when the tractor-trailer is being manipulated around a curve, as previously explained. Thus, the essence of this invention is the adaptation of the additional mirror E to the existing frame work and rearview mirror of the vehicle, and the structure for this additional mirror, which does provide a maxi-vision upon viewing through it, is more adequately disclosed in detail, or its various structural components, as can be seen, in FIG. 4. As shown, the mirror comprises the reflecting mirror surface 2 that has a back plate 3 which may be comprised of metal, or other sturdy material, which not only supports the mirror from the rear side, but particularly from that side where debris, rocks, or other deleterious particles may strike the mirror and normally break it particularly when the vechicle is traveling in a forward direction. Thus, in the installed relationship, the back plate 3 actually will be facing forwardly of the arranged vehicle.

Surrounding the perimeter of the reflecting surface or mirror surface 2, and its back support frame 3, is a gasket 4, which may come in one or two parts, as shown, and which gasket embraces the side edges 5 of the mirror 2, in addition to the side edges 6 of the back support plate 3, while in addition, the upper and lower edges for these two components is also protected by means of the inturned upper and lower edges 7 and 8, as shown. Over this combination of mirror and plate edges, and the gaskets 4, is provided a frame means 9, and which frame means is fabricated from a pair of frame parts 10, which frame parts are formed of U-shaped material, such as a metal, or the like, in cross section, so that the centralized slot formed in the framed parts can overlie the arranged gaskets 4, and tightly embrace the periphery of the mirror and its support plate in place. The frame parts 10 include upper and lower inturned ends, as at 11, and which inturned ends also embrace the gaskets 7, and the upper and lower edges of the mirror and plate, as previsously explained, so as to provide full support entirely around the perimeter of these components. Connectors 12 and 13 are furnished for inserting over the contiguous end edges of the inturned ends 11, as explained, and it can be seen that fasteners, such as the screws 14, insert through apertures, as at 15, formed in the various connectors, and are threadedly engaged, or otherwise fastened, through the apertures 16, of each of the inturned ends 11, in order to complete the perimeter connection of the frame parts 10 entirely around the periphery of the mirror 2 and its support plate 3. Before this connection is made, though, a fastener, such as the bolts 17, insert through the aligned apertures 18 formed through each of the connectors, and extend further upwardly, or downwardly, for rearrangement through the apertures 19 provided through the upper and lower brackets 20 and 21, respectively. Then, a nut, or other fastening means, may secure onto the fasteners 17, in order to tightly bind the entire structure intermediate the two brackets 20 and 21, but yet, allow the mirror and its support plate to remain pivotal, under force, so that it can be adjusted to that angular disposition or direction found most desirable by the driver to provide for a complete rear viewing as required. It may also be recognized that the fasteners 17 include an integral head means 22, and which are flattened along two sides, as shown at 23, so as to conviently insert within the slot 24 formed internally centrally of each of the connectors 12 and 13. Thus, when the fastener or bolts 17 are located into position, within the connector, they will be restrained from turning by means of the flattened surfaces 23 encountering internal edges of the sides of each of the connectors, as identified. In addition, and as can be seen with the connector 12, the connector may have an elevated integral portion 25 which provides some clearance for the fastener head 22 to locate so as to further provide adequate clearance for the insertion of the inturned ends 11 of each of the frame parts 10 as they come into proximity with each other at both the upper and lower edges of the mirror, as when the frame means is being installed.

Each of the upper and lower brackets 20 and 21, respectively, extends sufficient distance so as to provide for their opposite ends to become arranged in proximity with the fasteners H, as previously explained, holding the standard rearview mirror C into position upon its next framework G. To provide for the convenience of the insertion of the upper and lower brackets 20 and 21 into position, each of these ends include an integral slot 26 and 27, and which slots may conveniently be slid into position underneath of the previously identified fasteners H, provided at both the upper and lower edges of the rearview mirror C, so that when these fasteners H are tightly secured into position, they will snugly bind against the brackets 20 and 21 and firmly adhere the additional mirror firmly into position.

Figure 2:
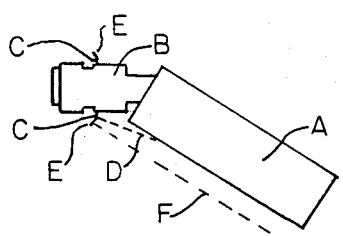
FIG. 2, as previously explained, provides a schematic plan view of a tractor-trailer embodying this invention and undertaking a curved path of travel.

It should also be noted that the upper and lower brackets 20 and 21 further include the apertures 28, and the disposition of these apertures at these locations are provided for accommodating another mirror and plate combination, such as the mirror 2, and back support plate 3, in the event that the standard rearview mirror C is unavailable, broken, and there is a need for a further mirror to provide multiple lines of vision as previously explained and as shown in FIG. 2.

Variations or modification to this invention may occur to those skilled in the art upon reviewing the subject matter of this disclosure. Such variations, if within the spirit of this invention, are intended to be encompassed within the scope of any claims to patent protection issuing upon this invention. The description of the preferred embodiment set forth herein is done so for illustrative purposes only.

Having thus described the invention what is claimed and desired to be secured by Letters Patent is:

1. A vehicle mirror for providing maximum vision for the driver, and for use in conjunction with an existing external rear view mirror and frame associated with the vehicle, comprising, an upper and lower bracket operatively associated with the rear view mirror and frame, said bracket disposed for extending directionally away from said existing mirror, a frame means, said frame means securing with the upper and lower brackets, and an additional mirror held by said frame means and being arranged for independent angular adjustment to supplement the rear viewing by the vehicle driver during reverse movements and turning, said additional mirror being pivotally mounted with respect to its support by the upper and lower brackets, and additional mirror and brackets being independently pivotally mounted with respect to the external rear view mirror and frame, said frame means surrounding the periphery of said additional mirror, and said frame means being connected with the upper and lower brackets, said frame means including a pair of frame parts that embrace at least the sides of the said additional mirror, each frame part being formed of a U-shaped channel having a central slot therein, with the central slot being arranged for embracing the proximate edges of the additional mirror, each frame part being arranged for location contiguously with the additional mirror side edges, and each frame part having upper and lower inturned ends for partially embracing the proximate upper and lower edges of the additional mirror, a gasket arranged upon the mirror edges and disposed for location within the channel slot of the frame parts for securement of the mirror therein, and upper and lower connectors each securing the proximate ends of the frame parts together for providing an embracing of the additional mirror, with said connectors securing the proximate inturned frame part ends together, said connectors pivotally mounting to their respective upper and lower brackets, each connector being U-shaped and cross sectioned, each connector disposed for matingly inserting over the proximate ends of each frame part, and fasteners securing the connector with the contiguous frame part ends, each connector having a centrally arranged aperture therein, and another fastener provided through said connector aperture and arranged for securing with either the proximate upper or lower disposed brackets, said upper and lower brackets including at least one aperture there through, said connector securing therein for support of an additional mirror thereto, the end of each upper and lower bracket securing with the existing external rear view mirror and frame having elongated slots, and said elongated slots disposed for facilitating the securement of said additional mirror and said frame to the existing rear view mirror and frame, a back support plate arranged along the backside of the said additional mirror and provided for protection of the additional mirror against breakage, and wherein said combined back support plate and mirror being embraced by the frame means surrounding their periphery thereof.

* * * * *